(No Model.) 4 Sheets—Sheet 1.

A. W. & A. H. ROOVERS.
VENDING INSTRUMENT.

No. 553,872. Patented Feb. 4, 1896.

Witnesses
Y. Wadman
Pierson L. Wells

Inventors
Alfred W. Roovers,
Alexander H. Roovers,
by Emma L. Brown
THEIR ATTORNEY.

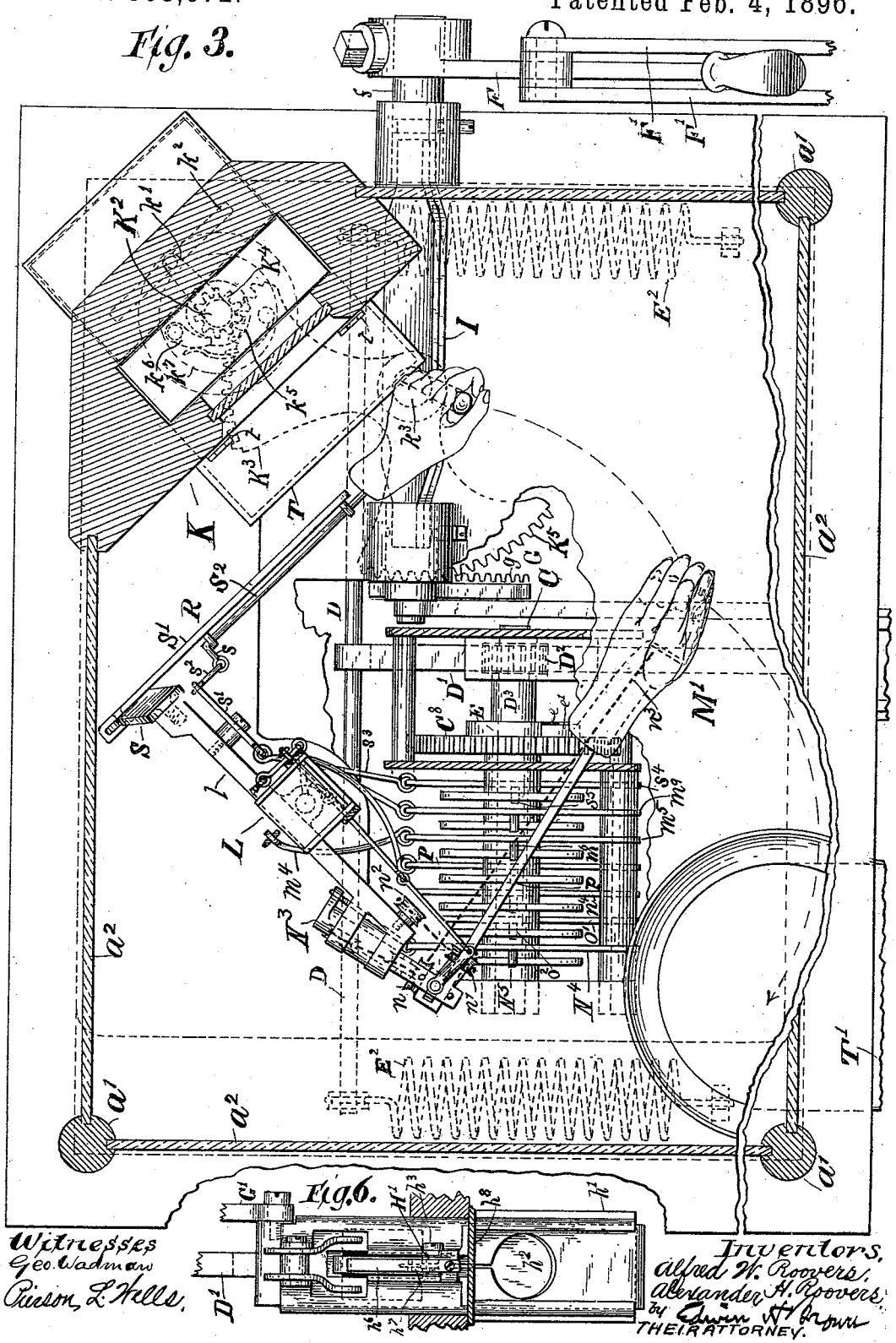

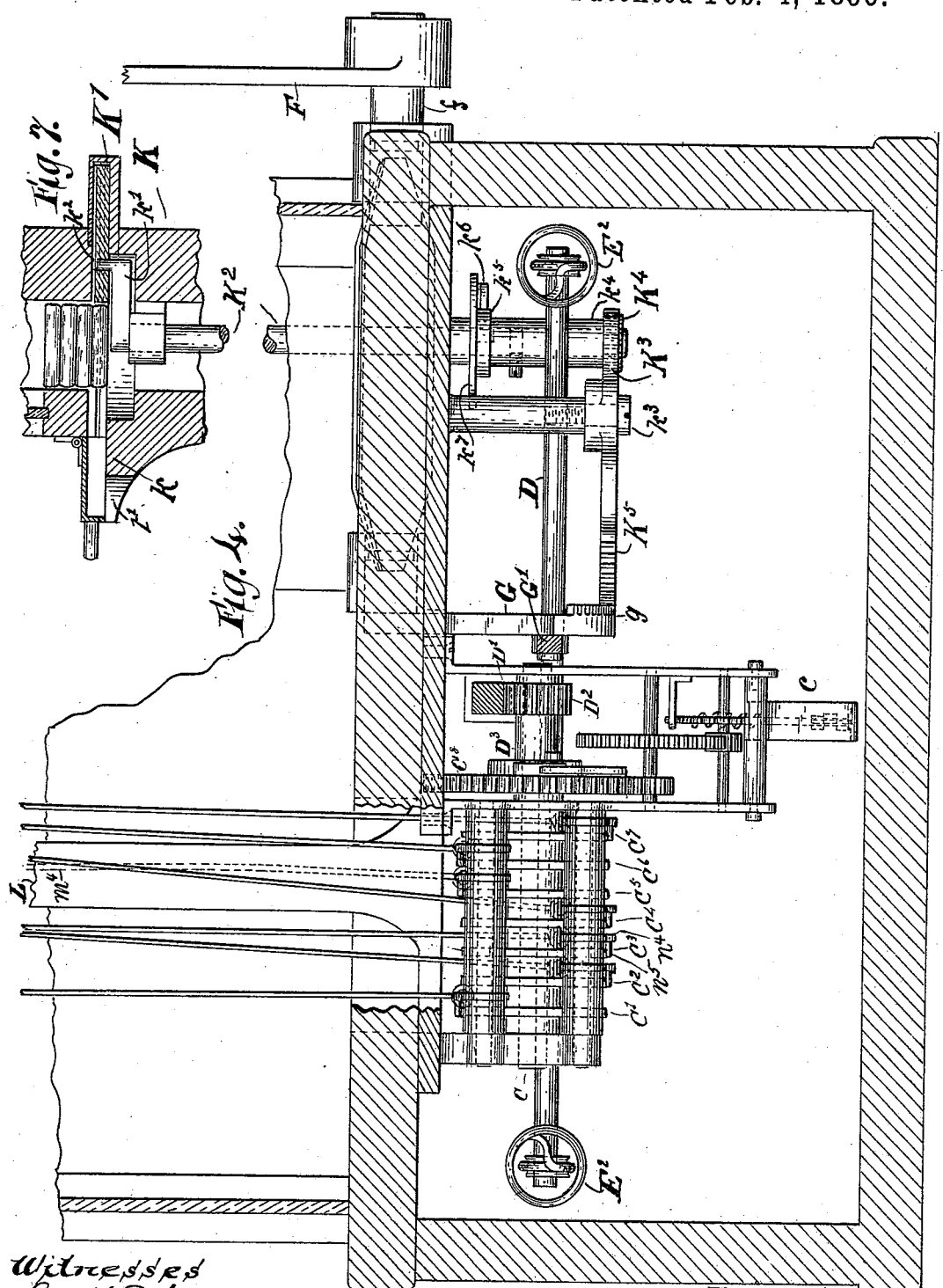

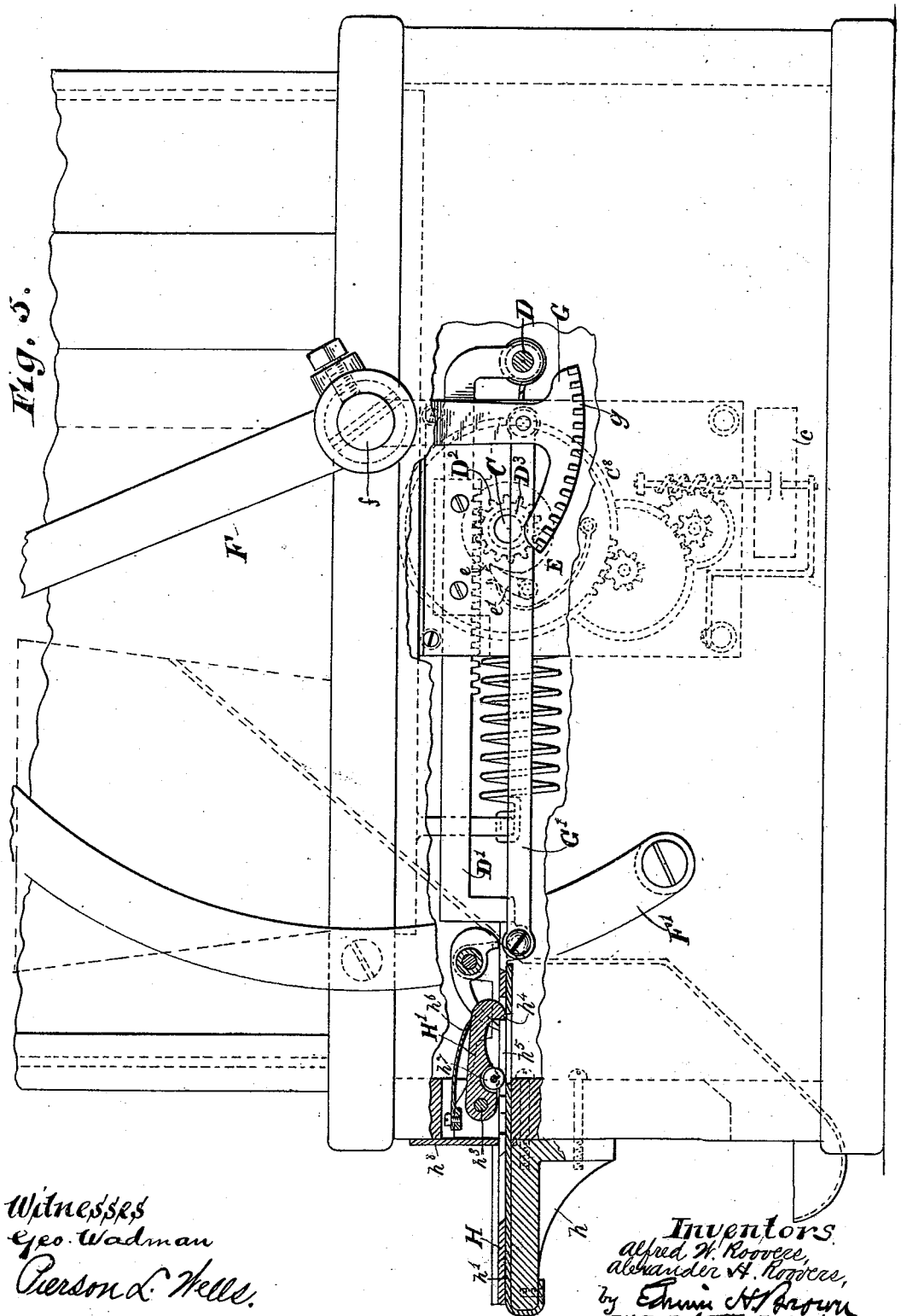

UNITED STATES PATENT OFFICE.

ALFRED W. ROOVERS AND ALEXANDER H. ROOVERS, OF BROOKLYN, NEW YORK.

VENDING-INSTRUMENT.

SPECIFICATION forming part of Letters Patent No. 553,872, dated February 4, 1896.

Application filed May 2, 1895. Serial No. 547,883. (No model.)

*To all whom it may concern:*

Be it known that we, ALFRED W. ROOVERS and ALEXANDER H. ROOVERS, of Brooklyn, in the county of Kings and State of New York, have invented a certain new and useful Improvement in Vending-Instruments, of which the following is a specification.

We will describe a vending-instrument embodying the features of our improvement, and then point out the novel features in the claims.

Figure 1:
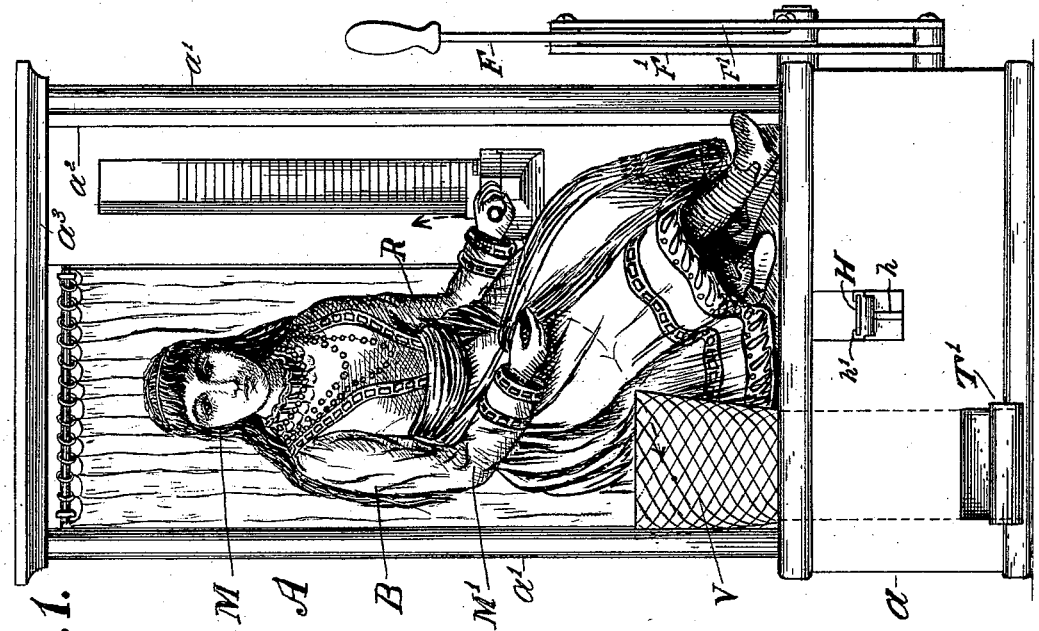
Figure 2:
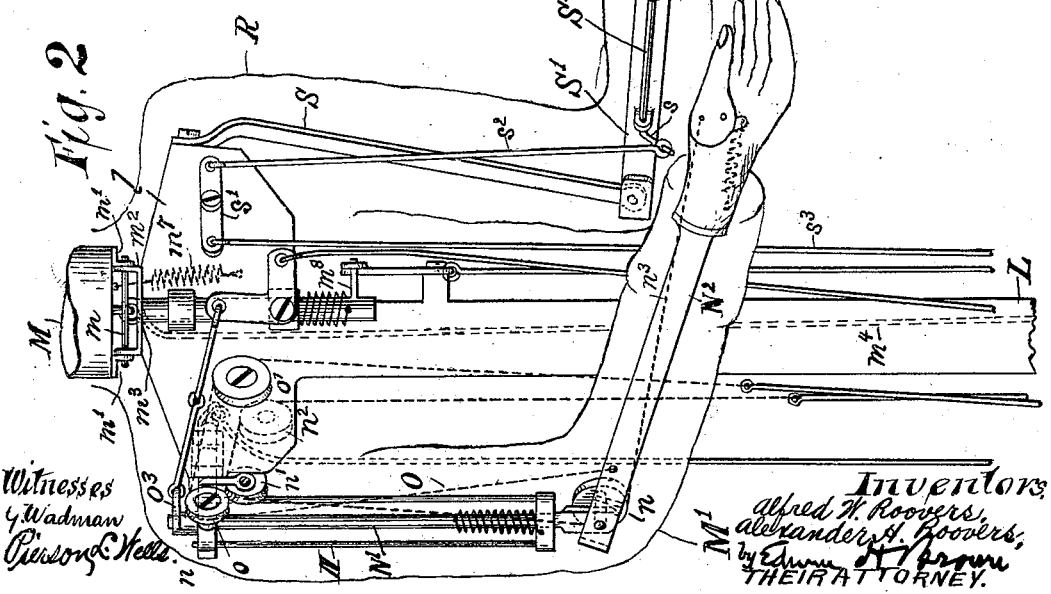

In the accompanying drawings, Figure 1 is a front view of a vending-instrument embodying our improvement. Fig. 2 is an enlarged view of the interior of the automaton represented in Fig. 1, showing in part operative means adapted to cause the various members of the automaton to pass through a certain sequence of motions. Fig. 3 is a sectional plan view of the instrument as shown by a horizontal plane taken at the level of the shoulders of the automaton. Fig. 4 is an elevation of the lower front portion of the instrument with the front of the outer casing removed, and shows a method of applying the motive power for actuating the members of the automaton. Fig. 5 is an elevation of the lower side portion of the instrument with a portion of the outer casing removed, the better to show a coin-slide and a construction of the means adopted for applying power to the mechanisms of the automaton. Fig. 6 is a top view of the coin-slide and co-operating adjuncts. Fig. 7 is an enlarged section through the receptacle holding the vendible articles.

Similar letters of reference designate corresponding parts in all figures.

A is the inclosing case of the instrument. As here represented this inclosing case comprises a base $a$, box-like in form, within which the main portion of the driving mechanism may be located, posts $a'$ extending upward from the base $a$, glass sides $a^2$ held between the posts $a'$ and a surmounting roof $a^3$.

Of course the construction thus far specified may be departed from as thought advisable, as it in no way concerns the spirit of our invention.

B is the automaton, which during the operation of the instrument withdraws the package of chocolate, candy, or other vendible article from the receptacle wherein a number of such are held, and then delivers it to a place accessible to the purchaser, the figure meanwhile performing other movements which it may be deemed will enhance the lifelike impression conveyed by the appearance of the figure. The figure here employed is that of a girl, but others may be employed.

C is a cam-shaft to which are secured a series of cams $C'$ $C^2$ $C^3$ $C^4$ $C^5$ $C^6$ $C^7$, the movable members of the automaton being driven from these latter. A spur-wheel $C^8$ is secured to the shaft C and meshes with one of a series of gears constituting a train of gearing driving a regulating-fan $c$.

D is a rod extending lengthwise of the instrument and supporting a rack-bar $D'$ attached to and extending transversely from the rod.

$D^2$ is a spur-wheel secured to a sleeve $D^3$ mounted to rotate upon the cam-shaft C. The spur-wheel $D^2$ meshes with the rack-bar $D'$, while at the other end of the sleeve $D^3$ there is secured a disk E having a tooth $e$. The spur-wheel $C^8$ carries a pivoted spring-pressed pawl $e'$ engaging with the tooth $e$, motion being transmitted from the sleeve $D^3$ to the spur-wheel $C^8$ through this connection.

$E^2$ $E^2$ are springs secured to a stationary part of the instrument and the rod D, and tending to draw the rack-bar $D'$ to one extreme of its movement.

F is the operating-lever of the instrument, secured to a spindle $f$ suitably journaled in bearings supported by the instrument and moving through a slot formed between two guide-bars $F'$ $F'$ secured at the side.

Within the instrument the spindle $f$ supports, rigidly secured thereto, a dependent arm G, the lower end of this arm being curved to the arc of a circle. From this lower curved portion projects a lateral flange $g$, in which are formed teeth whose purpose will presently appear.

G' is a link pivoted to the lower part of the arm G and extending to and fulcrumed to the coin-slide H, which will now be described.

The coin-slide H passes through the front wall of the outer casing A, being supported exteriorly of the instrument on a bracket $h$. A plate $h'$ is secured to the bracket, there being formed thereon a guideway for the coin-slide. The coin-opening in the coin-slide is represented at $h^2$, the edges of this opening contacting with the edges of the coin and sliding the latter along the upper surface of the plate $h'$.

H' is a lever fulcrumed at $h^3$ to the upturned edges of the plate $h'$ and having a hook-shaped outer end $h^4$, which protrudes into an elongated slot $h^5$ in the coin-slide H, being normally depressed therein by a spring $h^6$. A roller $h^7$ is mounted on the lever H', the lower portion of its periphery extending into the path of the advancing coin in the coin-opening $h^2$. If now the coin is of the proper thickness, as it comes in contact with the roller $h^7$ it will tilt the lever H' upward, withdrawing the hook-shaped end $h^4$ from the slot $h^5$ and permitting the coin-slide H to be slid inward to the end of its movement, the coin then dropping into the interior of the base $a$.

If the coin deposited in the coin-opening is too thin, the lever H' will not be tilted enough to withdraw the hook-shaped end $h^4$ from the slot $h^5$, and the slide is locked from any further inward movement by striking against the hook-shaped end $h^4$. If the coin is too thick, a guard $h^8$ placed above the coin-slide, with its lower edge in close proximity thereto, precludes the movement of the coin under it. As the rack-bar D' is formed at one end to project into the path of the coin-slide H, it will be moved toward the rear of the instrument when the operating-arm F is pulled downward, the construction so far described evidently effecting this result through the link G' connecting the dependent arm G with the coin-slide H. By depressing the arm F the following movements will result—to wit, an inward movement of the slide H to deposit its coin in the base $a$ and a longitudinal movement of the rack-bar D' rotating the spur-wheel $D^2$ and the sleeve $D^3$ in an opposite direction to that which would engage the pawl $e'$ with the tooth $e$. The rack-bar D' is not secured to the coin-slide H, simply abutting against the end thereof. Consequently the slide may move in one direction independently of the rack-bar.

The spindle $f$, to which the operating-lever F is secured, will be preferably provided with a flexible connection between that portion to which the lever is secured and that portion to which the dependent arm G is affixed, as distinguished from a positive connection, since if the latter construction is used and the slide H is caught or wedged in any way before it has finished its movement a full depression of the lever F might break the mechanism. A flexible connection will admit of the full movement of the lever F, while at the same time it will obviate an overstraining of the parts sufficient to break them. The flexible connection we prefer consists of a torsional spring I firmly secured at its ends to short shafts, which, together with the spring, form the spindle $f$.

The rack-bar D' will return slowly to its original position under the influence of the springs $E^2$ $E^2$ and the regulating-fan $c$, the engagement of pawl $e'$ and tooth $e$ permitting this movement. The cam-shaft C is at the same time rotated.

We provide the disk E with one tooth, for the reason that it will require a complete rotation of the disk to carry its tooth past the pawl $e'$. This full rotation cannot be imparted to the disk by the lever F until the cam-slide H has been drawn into the instrument sufficiently far to deposit the coin therein.

We will now pass to a description of the receptacle for holding the articles sold by the instrument and the mechanism for delivering the articles one by one from the receptacle.

K is the receptacle, within which there is held a suitable supply of candy, chocolate, or packages of other commodities, placed one above the other. A sliding plate K' is fitted in a chamber at the bottom of the receptacle K to push a package out from under the superincumbent packages onto a shelf $k$, from which it may be withdrawn and delivered to the purchaser, the slide returning to its rear position, whereupon another package drops down in front of it. The means for securing this movement of the plate K' are in the present instance as follows: An upright shaft $K^2$ carries at its upper extremity a crank-pin $k'$ entering a slot $k^2$ in the plate K', which, when the shaft $K^2$ is rotated, imparts a longitudinal movement to the plate.

$K^3$ is a segment of a gear-wheel mounted upon a downwardly-projecting stud $k^3$ secured within the base $a$. The segment $K^3$ meshes with a spur-wheel $K^4$ secured to a sleeve $k^4$ mounted to rotate upon the shaft $K^2$. To the upper portion of the sleeve $k^4$ there is affixed a toothed disk $k^5$, with the tooth of which engages a spring-pressed pawl $k^6$ pivoted on a pawl-carrier $k^7$ rigidly secured to the shaft $K^2$. It is evident from this construction that the segment $K^3$ must be rotated to a sufficient extent to give the spur-wheel $K^4$ a complete rotation before the tooth of the disk $k^5$ will engage with the pawl $k^6$ to rotate the shaft $K^2$ and force a package out from the receptacle. A second segment, $K^5$, extends from the segment $K^3$ and meshes with the teeth on the flange $g$ to impart motion to the latter segment $K^3$. Thus any displacement of a package is precluded until a coin is inserted in the slide and the lever F fully depressed to draw the slide inward to its farthest limit.

We will now describe the automaton and the contrivances by which its various movements are obtained.

L is a standard within the figure for supporting the same. It has a cross-piece $l$ at the location of the shoulders. The head M of the figure is articulated to the body to permit a forward and backward inclination of the same as well as a partial rotary movement relatively to the body. This articulation in the present instance comprises a rod $m$ secured at its ends to brackets $m'$ extending from one member and journaled in brackets $m^2$ extending from the opposite member. A pin or stud $m^3$ is provided to permit a rotary movement. A link $m^4$ fastened to the rear side of the neck, at its lower end, is secured to the free end of a pivoted lever $m^5$, from which there extends a pin $m^6$ bearing upon the cam $C^5$. The movement of the cam $C^5$ effects a forward inclination of the head while the latter is drawn backward by a spring $m^7$ fastened at one end to the neck and at the other to the body. The stud $m^3$ is provided with an arm $m^8$, which communicates by a bell-crank and rod with a pivoted lever $m^9$ actuated by cam $C^6$. The lower arm of the arm M' has a swinging up-and-down movement about the elbow and a sweeping movement about the elbow from side to side, while the thumb of this hand has a movement toward and away from the palm. These respective movements may be obtained as follows: A post N is secured to the cross-piece $l$ projecting downward therefrom through the forearm. N' is a shaft mounted in bearings supported on the post N. An arm $N^2$ is pivoted to the shaft N' and extends through the forearm to the hand, which is secured to it. At the lower end of the shaft N' there is mounted a guide-wheel $n$, while near its upper extremity there is a second guide-wheel $n'$. A third guide-wheel $n^2$ is also shown.

The post N is shown as having a transverse stud $N^3$ journaled in bearings carried by the cross-arm $l$. This stud is vibrated through the means of a suitable connection with a pivoted lever $N^4$, having a pin $N^5$ bearing upon the periphery of the cam C'.

The thumb of the hand of the arm M' is jointed to the hand to permit of a movement thereof toward and away from the palm. A cord $n^3$ is secured at one end to the thumb, so that a pull on the former will swing the thumb on its pivot. The cord passes over the guide-pulleys already mentioned and at its lower extremity is fastened to a pivoted lever $n^4$, a projecting pin $n^5$ from which bears upon the periphery of the cam $C^3$ to swing the lever upon its pivot. Of course springs or their equivalents may be used to return the parts to their original positions. A box held in the hand may be used to transfer the package.

A cord O secured to the arm $N^2$ passes over a pulley $o$ mounted on the cross-arm $l$, from thence over a second guide-pulley $o'$ and then downward to a pivoted lever O', a transverse pin $o^2$ on which bears upon the cam $C^2$, the elevation and depression of the hand being secured by this means.

The shaft N' at its upper extremity is provided with a crank $o^3$, which communicates through suitable links, levers, and connecting-cords with a pivoted lever P, a transversely-extending pin $p$ of which bears upon the periphery of the cam $C^4$, the movement of the latter giving to the forearm a swinging movement from side to side.

Passing now to the arm R, S is a side bar rigidly secured to the cross-bar $l$ at its upper end and passing downward through the upper arm to the neighborhood of the elbow, where a second bar S' is pivotally connected to it, this second bar extending outward within the forearm toward the hand. A rod $S^2$ is mounted in supports secured to the bar S' to rotate therein, rotating the hand thereby, which is secured to it. The rod $S^2$ is bent at one end to form a crank $s$, the end of the crank being connected with one end of a double-arm lever $s'$ by a link $s^2$. A link $s^3$ transmits motion to the other end of the lever $s'$ from a pivoted lever $s^4$, the latter having a pin $s^5$ bearing upon the periphery of the cam $C^7$.

The hand of the arm R grasps the handle of a cover T arranged over the shelf $k$ and hinged at $t$. As the rod $S^2$ is rotated, thereby rotating the hand, the latter, together with the forearm, will be swung upward, revealing the package thrust out upon the shelf $k$. This latter has a notch $t'$ in its edge, the package extending over this notch that it may be the more easily grasped by the hand. V is a basket or other receptacle into which the package is deposited by the hand, and from which it finds its way to the outside of the instrument through the chute T'.

Having described the construction of our improvement, its operation may be described as follows:

Having deposited the proper coin in the coin-slide H, the lever F is grasped and brought to its lowermost position, thereby carrying the slide inward and depositing the coin in the interior of the instrument. At the same time the rack-bar D' has rotated the spur-wheel $D^2$ the disk E has been given a full rotation, carrying the tooth $e$ past the pawl $e'$, and the springs $E^2$ $E^2$ have been drawn out. The springs $E^2$ $E^2$ now drive the cam-shaft C in a manner already described, rotating the cams thereon. Simultaneous with the movement of the rack-bar D' backward, as it drives the cam-shaft C, a package is thrust out upon the shelf $k$ by the slide K' and its operating mechanism. The cams C' $C^2$ $C^3$ $C^4$ $C^5$ $C^6$ $C^7$ are so arranged upon the cam-shaft C that the following sequence of movements is now performed by the automaton: The automaton first bows, inclining its head forward. The arm K then lifts the cover T, exposing a package upon the shelf $k$, which is grasped by the hand of the arm M', the latter moving forward for this purpose and closing the thumb down upon the package. The head, slightly inclined forward, follows the arm in this movement, turning upon its axis for this purpose. Having grasped the package, the arm M' moves away from the shelf $k$, the head rotating in an opposite direction to that in which it has previously moved. The hand still continues to move toward the basket V, into which the package is dropped when reached. The head returns to its upright position, which is followed by an elevation of the arm M' carrying the fingers to the mouth of the automaton, which are then cast outward, as if in the act of throwing a kiss, and the parts assume their normal position.

Having described our invention, what we consider as new, and desire to secure by Letters Patent, is—

1. In a vending-instrument, the combination of an automaton provided with articulated members, mechanisms for imparting a life-like movement to members of the automaton, a movable part to be operated manually to cause said mechanisms to operate and a device under the control of a coin for putting said mechanisms in operative connection with said movable part, substantially as specified.

2. In a vending-instrument, the combination of an automaton provided with articulated members, mechanisms for imparting a life-like movement to members of the automaton, a lever to be operated manually to cause said mechanisms to operate, and a device under the control of a coin for putting said mechanisms in operative connection with said lever, substantially as specified.

3. In a vending-instrument, the combination of an automaton provided with articulated members, mechanisms for imparting a life-like movement to members of the automaton, a cam-shaft from which said mechanisms are actuated, a rack-and-pinion connection for rotating the cam-shaft, a movable part to be operated manually to draw the rack to one end of its movement, and springs for drawing the rack to the opposite end of its movement, substantially as specified.

4. In a vending-instrument, the combination of an automaton provided with articulated members, mechanisms for imparting a life-like movement to members of the automaton, a lever to be operated manually to cause said mechanisms to operate a coin-slide moved to and fro by said lever and a flexible connection between the lever and said mechanisms, whereby if the slide is prevented from moving, the lever may be moved to its extreme position without affecting said mechanisms, substantially as specified.

5. In a vending-instrument, the combination of an automaton provided with articulated members, mechanisms for imparting a life-like movement to members of the automaton, a cam-shaft, a lever, a rack-and-pinion movement operated by said lever, and a pawl-and-ratchet connection between the rack-and-pinion movement and the cam-shaft, the ratchet-wheel having a single tooth whereby a complete movement of the rack is required to actuate the cam-shaft, substantially as specified.

6. In a vending-instrument, the combination of an automaton provided with articulated members, a receptacle for holding a number of articles, a slide for withdrawing the articles consecutively from the receptacle, an operating-lever, a coin-slide moved by the movement of the lever and mechanism under the control of the operating-lever for causing the automaton to deliver the package withdrawn from the receptacle to the purchaser, substantially as specified.

In testimony whereof we have signed our names to this specification in the presence of two subscribing witnesses.

ALFRED W. ROOVERS.
ALEXANDER H. ROOVERS.

Witnesses:
W. LAIRD GOLDSBOROUGH,
PIERSON L. WELLS.